(12) United States Patent
Meredith et al.

(10) Patent No.: US 7,919,145 B2
(45) Date of Patent: Apr. 5, 2011

(54) SILICA FILMS AND METHOD OF PRODUCTION THEREOF

(75) Inventors: Paul Meredith, Brisbane (AU); Michael Harvey, Brisbane (AU); Robert Vogel, Highgate Hill (AU)

(73) Assignee: Xerocoat Inc., Redwood City, CA (US)

( * ) Notice: Subject to any disclaimer, the term of this patent is extended or adjusted under 35 U.S.C. 154(b) by 899 days.

(21) Appl. No.: 10/579,654

(22) PCT Filed: Nov. 22, 2004

(86) PCT No.: PCT/AU2004/001622
§ 371 (c)(1),
(2), (4) Date: May 18, 2006

(87) PCT Pub. No.: WO2005/049757
PCT Pub. Date: Jun. 2, 2005

(65) Prior Publication Data
US 2007/0148435 A1    Jun. 28, 2007

(30) Foreign Application Priority Data

Nov. 21, 2003   (AU) ............................... 2003906427

(51) Int. Cl.
 *B05D 3/04*   (2006.01)
 *B05D 3/02*   (2006.01)
(52) U.S. Cl. ............ 427/335; 427/5; 427/165; 427/226; 427/299; 427/372.2; 427/376.2; 427/377; 427/397.7; 427/419.2; 427/428.2; 427/429; 427/430.1; 428/312.6; 428/446
(58) Field of Classification Search .................. 427/335
See application file for complete search history.

(56) References Cited

U.S. PATENT DOCUMENTS

| 3,922,392 | A |   | 11/1975 | Kohlschutter et al. |
| 5,639,517 | A |   | 6/1997  | Floch et al. |
| 5,698,266 | A | * | 12/1997 | Floch et al. ............... 427/376.2 |
| 6,099,911 | A |   | 8/2000  | Yano et al. |
| 6,291,697 | B1 |  | 9/2001  | Tanaka et al. |
| 6,316,572 | B1 | * | 11/2001 | Nambu et al. .................. 528/33 |

(Continued)

FOREIGN PATENT DOCUMENTS

EP    834488 A    4/1998

(Continued)

OTHER PUBLICATIONS

ColCoat Co Ltd. fact sheet printed from the website of said company.

(Continued)

*Primary Examiner* — Michael Kornakov
*Assistant Examiner* — Alexander Weddle
(74) *Attorney, Agent, or Firm* — Harness, Dickey & Pierce, P.L.C.

(57) ABSTRACT

A method of producing a silica coating by forming a silica precursor formulation that is coated on a substrate as a continuous liquid phase. The silica precursor formulation is then cured in an ammoniacal atmosphere to produce a continuous, interconnected, nano-porous silica network.

19 Claims, 7 Drawing Sheets

U.S. PATENT DOCUMENTS

| | | |
|---|---|---|
| 6,403,183 B1 | 6/2002 | Iwamiya et al. |
| 6,511,721 B1 | 1/2003 | Murata et al. |
| 6,599,976 B2 | 7/2003 | Kobayashi et al. |
| 6,610,145 B2 | 8/2003 | Hendricks et al. |
| 2002/0041932 A1 | 4/2002 | Ogawa |
| 2004/0028915 A1 | 2/2004 | Shibuya et al. |
| 2004/0048960 A1 | 3/2004 | Peterson et al. |

FOREIGN PATENT DOCUMENTS

| | | |
|---|---|---|
| EP | 1074859 A | 2/2001 |
| JP | 04-180977 | 6/1992 |
| JP | 08-120225 | 5/1996 |
| JP | 10-226767 | 8/1998 |
| JP | 10-316934 | 12/1998 |
| WO | WO 94/23315 | 10/1994 |

OTHER PUBLICATIONS

Ishino et al., "Mass production of hydrophobic silica aerogel and readout optics of Cherenkov light", Nuclear Instruments and Methods in Physics Research A 457 (2001) pp. 581-587.

\* cited by examiner

SILICA FILMS AND METHOD OF PRODUCTION THEREOF

FIELD OF INVENTION

This invention relates to silica films, a method of production thereof and the use of the silica films as anti-reflective and/or anti-fogging and/or protective coatings. In particular the invention relates to silica films having a refractive index lower than or equal to typical silica glass.

BACKGROUND

Typically low refractive index thin films are made utilising sol-gel processes or vacuum evaporation deposition techniques. The following prior art documents are but a few examples of methods used to produce low refractive index films made from silica.

WO 02/41043 is directed to a method of forming a mesostructured inorganic/block copolymer composite or inorganic porous solid doped with a dye or dye sensitive agents, formed by creating a silica sol-gel from tetraethoxysilicate (TEOS), ethanol and water. The sol-gel is then templated with block copolymers, such as poly(ethylene oxide)-poly(alkyene oxide)-poly(ethylene oxide). The inorganic/organic composite is then calcined or subjected to solvent extraction to remove excess block copolymer species, prior to doping with dye/dye sensitive agents.

U.S. Pat. No. 6,379,776 is directed to a multi-layer, antifogging and stain preventing glass coating comprising an alkaline shut-off film, a silica oxide/zirconium oxide composite, and a photocatalytic film, of titanium oxide. Both the silica oxide/zirconium oxide composite layer and the titanium oxide layers are formed using known sol-gel processes.

U.S. 2002/0090519 describes a method of hydrolytically polycondensing tetraalkoxysilanes to form a silica oxide sol. The hydrolytic polycondensation occurs by placing the tetraalkoxysilane in an aqueous alcohol ammoniacal solution to encourage hydrolysis of the tetraalkoxysilane and produce silica oxide particles. The sol is subject to steam distillation in order to remove the alcohol and ammonia prior to the pH being adjusted to between 3 and 8. Surfactants are then added to the silica sol to act as pore templates during the coating of a substrate. The coating is calcined to cure the silica film and remove the surfactants.

U.S. Pat. No. 5,948,482 is directed to a method of forming an aerogel thin film at ambient pressure, by forming a silica oxide sol-gel using standard processes before derivatizing the surface of the gel with a hyrdolysable organic substituent, reliquefying the sol with sonication and depositing the gel onto a substrate.

U.S. Pat. No. 5,698,266 is directed to a modification of the standard sol-gel method of forming an anti-reflective coating by mixing ethanol, tetraethoxysilicate (TEOS) and ammonia and hydrolysing for up to 48 hours to form a colloidal silicon oxide suspension dispersed in an aliphatic alcohol. The silica sol is then filtered to obtain silica particles for deposition onto a substrate, prior to drying. The coated substrate is placed in an ammoniacal environment for up to twelve hours to form an anti-reflective coating. This finals step is claimed to improve the binding between the silica particles, and so renders the film more robust.

C. Shelle et al, *J. Non-Cryst. Solids,* 218, pg 163, 1997, describes a method of producing anti-glare glass films using sol-gel coatings formed from methyltriethoxysilane, tetraethoxysilicate and tin oxide. The sol-gel is aged at 0° C. prior to deposition onto a substrate and calcining at 500° C.

G Wu, et al, *J. Non-Cryst. Solids,* 275, pg 169, 2000, describes a method of creating a sol-gel, in which tetraethoxylsilicate (TEOS) is catalysed in a two step acid-base process. The TEOS is initially aged in an ammonia-ethanol solution, pH adjusted, refluxed and a second pH adjustment made. In preparing the films, G. Wu et al deposit the sol-gel onto a substrate and expose to an ammoniacal environment.

Hass D. D. et al, NASA Contractor Report, 201733, teaches the coating of fibrous insulation with a reflective film such as silica, titanium dioxide, zirconium oxide and/or combinations thereof. The oxides are formed using known sol-gel processes into which the fibrous insulation is submersed to coat the fibres prior to vacuum or heat drying.

The above processes which rely on sol-gel techniques for producing thin films are complex, multi-step processes which are costly, involve high temperature steps in fabrication, and/or require a surfactant for templating. The films produced by these sol-gel processes are typically easy to damage and/or liable to delamination.

One of the few prior art processes for producing silica coatings without directly following the conventional sol-gel process is described in U.S. Pat. No. 6,231,989 assigned to Dow Corning Corporation. The patent describes a process of forming a coating from a solution comprising a resin containing at least two Si—H groups in a solvent, such as methylisobutylketone. The solution is coated to a substrate with about 5% of the solvent remaining in the coating. An aqueous basic catalyst causes condensation of the Si—H groups. The solvent is evaporated to leave a porous coating. In summary, the method uses an ammonia vapour step to improve adhesion and mechanical strength of the resultant film, but relies in the main part upon conventional sol-gel methods to produce the coating at room temperature and pressure. The preparation of suitable starting materials containing two Si—H groups is difficult, which limits the usefulness of the technique.

SUMMARY OF THE INVENTION

In one form, although it need not be the only or indeed the broadest form, the invention resides in a method of forming a silica film coated on a substrate including the steps of:
producing a silica precursor formulation having a water content of no more than 5% volume by adding silicic acid tetramethyl ester homopolymer to a solvent;
coating a substrate with the silica precursor formulation; and
curing the silica precursor formulation onto the substrate in a vaporous ammoniacal environment.

The solvent is suitably alcohol or an aqueous-alcohol solution.

The silica precursor formulation will typically contain an amount of silicic acid tetramethyl ester monomer (tetramethoxysilane).

The monomer may be provided as part of any one of a number of commercially available formulations such as methyl-silicate-51 (MS51-ColCoat Co. Ltd., Japan). Preferably the silica precursor formulation is formed by adding MS-51, comprising >94% silicic acid tetramethyl ester homopolymer by volume, <3% tetramethoxysilane by volume and <3% methanol by volume; to the solvent.

The silica precursor formulation may comprise about 0.01-1 parts water and 0.02-100 parts alcohol for each part of MS-51. Preferably the solvent solution is formed by adding about 0 to 15 parts alcohol and 0.2 to 1 part water for each part of MS-51. An example ratio of reagents in the silica precursor formulation is 1.0 part MS-51:0.1 part water: 10 parts alcohol.

The coating step is suitably performed by spin coating or dip coating. The method may further include the step of allowing the coating to settle before curing.

The curing step of the above method may be carried out by placing the coated substrate in a closed ammoniacal environment. The environment preferably contain water, ammonia and alcohol. The alcohol is suitably the same alcohol as used in the formation of the precursor.

It will be appreciated that the precursor is liquid during the coating step (before complete hydrolysis), and so the method does not follow the conventional sol-gel process described in the prior art. It will be further appreciated that the alcoholic ammoniacal curing environment is responsible for controlling the rates of hydrolysis and polycondensation in the post-deposited film, to create a nanoporous, stable, highly cross-linked silica network.

The method may further include the steps of controlling the alcohol content of the precursor and/or controlling the alcohol content in the ammoniacal environment, to control characteristics of the film.

Suitably the pore size may be related to the size of the alcohol molecule. The alcohol content in the precursor relates to the pore density which may also be related to the alcohol content in the ammoniacal environment.

The method is suitably carried out at or near room temperature and atmospheric pressure.

Another form of the invention provides a method of forming a silica precursor formulation, including the steps of:
forming a solvent solution; and
mixing silicic acid tetramethyl ester homopolymer with the solvent solution.

In a further form, the invention resides in a silica precursor formulation comprising;
about 1 part by volume including >94% silicic acid tetramethyl ester homopolymer and <3% tetramethoxysilane;
about 0.02-100 parts by volume alcohol; and
about 0.01-1 part by volume water.

In a still further form the invention resides in a silica film having a refractive index between 1.1 and 1.56 and a film thickness less than 100 microns formed by a method including the steps of;
producing a silica precursor formulation having a water content of no more than 5% by volume by adding silicic acid tetramethyl ester homopolymer to a solvent solution;
coating a substrate with the silica precursor formulation; and
curing the silica precursor formulation onto the substrate in a vaporous ammoniacal environment.

In yet another form the invention provides for the use of the silica film coated on a transparent substrate to provide an anti-reflective and/or anti-fogging and/or protective coating.

Throughout the specification the term "low refractive index" is intended to refer to a silica film of the invention having a refractive index less than silica glass in the wavelength range 200 nm to 20 μm.

DETAILED DESCRIPTION OF THE INVENTION

Example 1

10 ml of methyl-silicate-51 (comprising silicic acid tetramethyl ester homopolymer >94%, tetramethoxysilane <3%, methanol <3%) {supplied by COLCOAT CO. LTD. 3-28-6 Omorinishi, Ota-ku, Tokoyo 143-0015, Japan} is added to solution of 60 ml ethanol or methanol, and 1 ml water to form a silica precursor formulation having a water content of no more than 5% by volume.

The silica precursor formulation may comprise any alcohol that creates dispersed droplets throughout the silica precursor formulation and facilitate the formation of pores in the final film. Alcohols include but are not limited to: ethanol, methanol, iso-propyl alcohol, butanol, pentanol and certain other polyols such as ethylene glycol.

Figure 1:
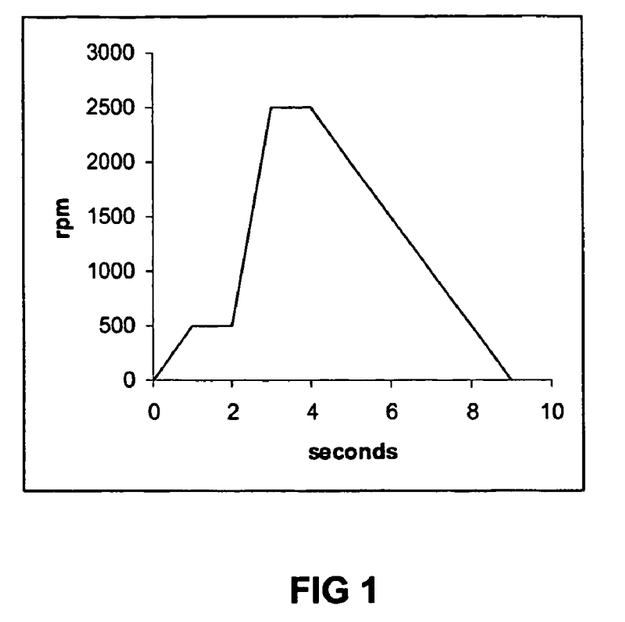
FIG. 1 is a spin profile for coating a substrate.

The precursor solution is applied to a substrate, in this example a glass slide, by spin coating at a spreading time=1 s, spreading speed=500 rpm, ramp=500 rpm/s, spin time=1 s, spin speed=2500, ramp=2500 rpm/s. A graph of the spin profile is shown in FIG. 1.

It will be appreciated that spin deposition conditions may be varied depending on the film thickness and refractive index desired. Other deposition techniques such as dip coating and spraying may also be used to apply the silica precursor formulation to a substrate.

Figure 2:
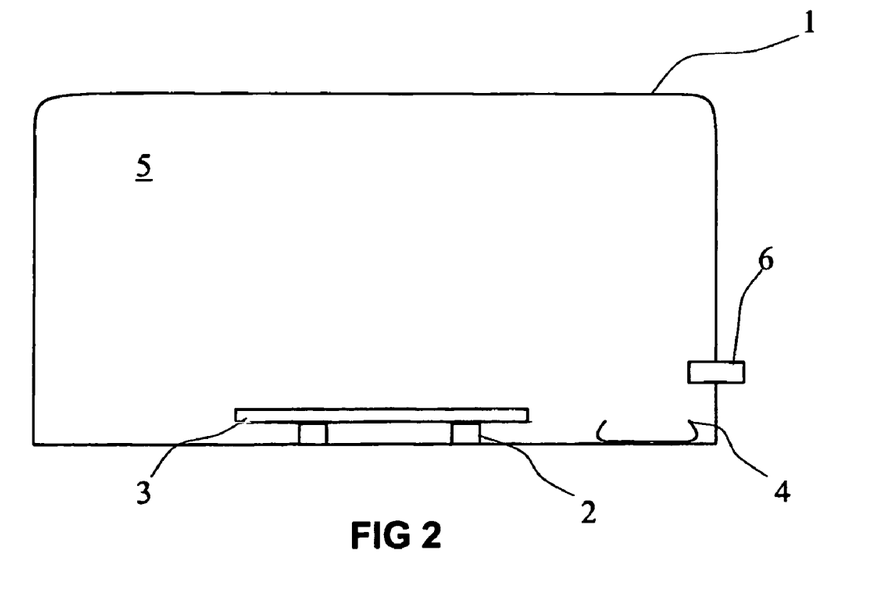
FIG. 2 is a schematic of a curing chamber.

It may be appropriate for the coated substrate to sit in an alcohol atmosphere for a time to allow equilibrium to be established between the alcohol in the atmosphere and the alcohol content of the silica precursor formulation on the substrate. As discussed below, the alcohol content in the silica precursor formulation influences the porosity of the film The coated substrate is then place in a closed container containing a curing agent (2.5 ml ammonia, 7.5 ml water and 20 ml alcohol), which creates an appropriate ammoniacal atmosphere for the silica film to cure. The container is arranged in such a manner that the film is never in contact with the curing liquid. This curing step continues until the film solidifies and becomes mechanically robust. A schematic of a curing chamber 1 is shown in FIG. 2. The chamber 1 is a closed system having some form of mount 2 in the base for receiving the substrate 3. A reservoir 4 is filled with a mixture of ammonia, alcohol and water which evaporates to produce an atmosphere 5 having a composition determined by the partial pressures of the ammonia, water and alcohol at the applicable temperature and pressure. A port 6 may be provided so that the mixture in the reservoir can be adjusted without opening the chamber.

It will be appreciated that any quantities of water, alcohol and ammonia/ammonium hydroxide may be used to create the ammoniacal atmosphere to cure the silica film.

The porosity of the produced film is determined, at least in part, by the alcohol in the silica precursor prior to curing. The alcohol in the silica precursor formulation is understood to produce pores in the film which remain after curing. The density of the pores is determined, at least in part, by the amount of alcohol present in the silica precursor formulation during curing, whereas the size of the pores is determined by the type of alcohol. A large polyol produces a larger pore size than, say, methanol or ethanol.

During the curing stage the water in the ammoniacal atmosphere causes hydrolysis of the silica precursor formulation. Equilibrium is established between the alcohol in the silica precursor formulation and the alcohol in the ammoniacal atmosphere. This means that the final porosity of the film can be controlled by placing the coated substrate in an alcohol environment prior to introducing ammonia to the chamber to catalyse the silica cross-linking reaction.

The reaction equation during curing is:

Si(OR)$_4$+4H$_2$O ⇌ Si(OH)$_4$+4ROH (Hydrolysis)

Si(OH)$_4$ ⇌ SiO$_2$+2H$_2$O (Condensation)

It will be appreciated that the prior art processes, such as found in U.S. Pat. No. 5,698,266, produce films of weakly bonded nano-particles of silica whereas the process described above produces a continuous, interconnected, nano-porous silica network. Hence the film is stronger and the characteristics of the film (porosity and refractive index) can be controlled.

The silica films of this example, and films produced in a similar manner to this example, were physically characterised. The results of the physical characterisation are summarised below.

Optical Transparency

The optical transparency of the film of Example 1, and similar films was determined using a Perkin Elmer Lamba 40 UV-Visible Spectrophotometer, having the following scan settings:

| | |
|---|---|
| Slit width | 2 nm, |
| Scan speed | 240 nm/min, |
| Data interval | 1 nm. |

An empty sample arm was used to determine the background spectra for correction purposes.

Figure 3:
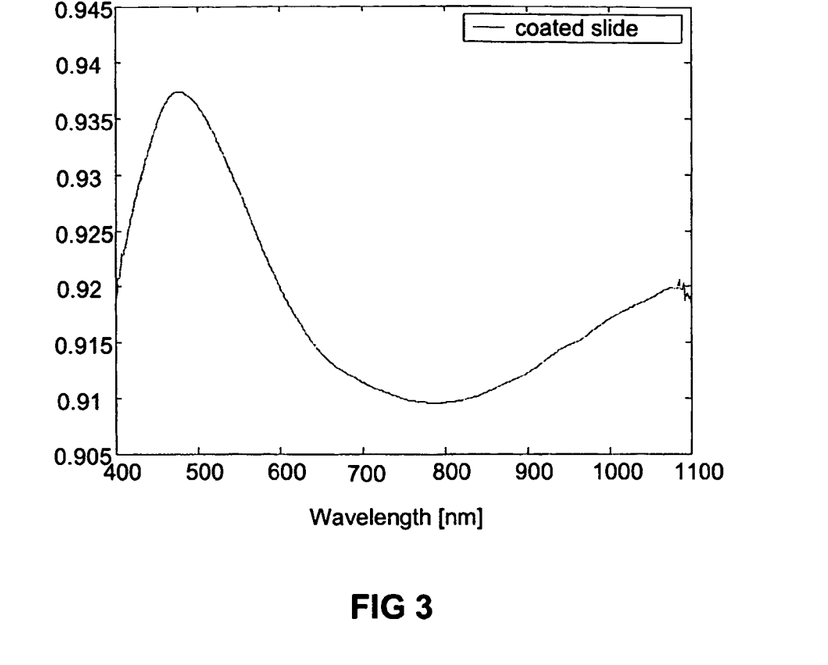
FIG. 3 is a graph of the UV-visible optical transmission spectrum of the film of Example 1.

The UV-Visible optical transmission spectrum was measured for the thin film (film thickness of less than 2 microns) of Example 1. The spectrum is shown in FIG. 3. The key feature of these spectra is the high optical transmission of the coated glass substrate over the entire visible spectrum. This observation may also be confirmed by simply looking a the coated glass substrate which appears transparent to the eye.

Figure 4:
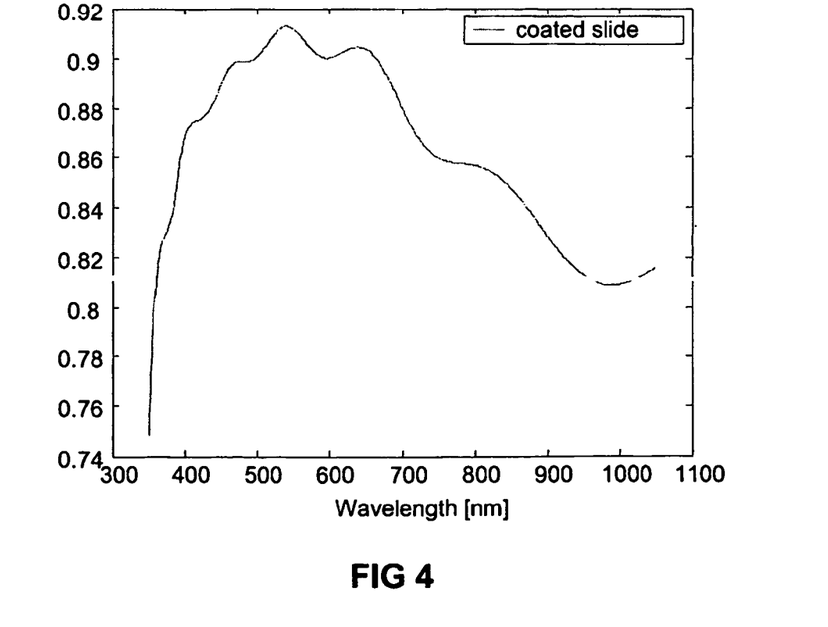
FIG. 4 is a graph of the UV-visible optical transmission spectrum of a spin coated film of silica on glass produced by the method of the invention.

FIG. 4 is a UV-Visible optical transmission spectrum for a silica film, having a film thickness of approximately 4 microns, formed in a similar manner to Example 1. The film used for this test was thicker than that used in FIG. 3 evidenced by the interference fringes, peaks and troughs, as a function of wavelength. The fringe contrast is appreciable (~5%), indicating that the refractive index of the film is <1.3.

Figure 5:
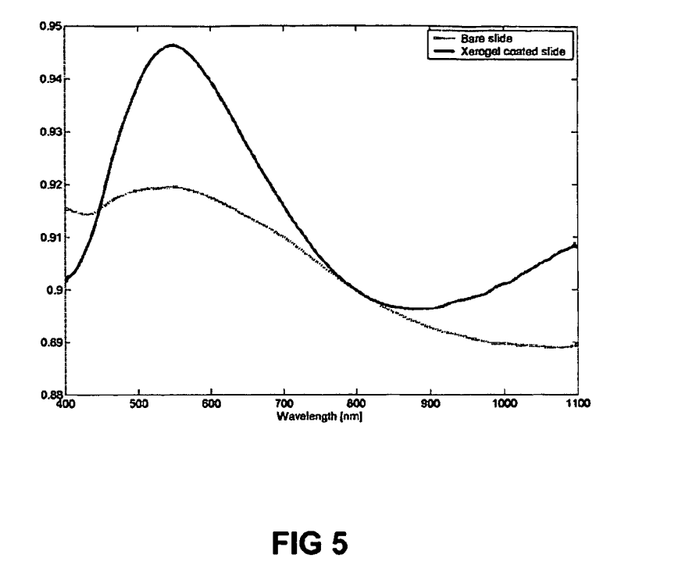
FIG. 5 is a UV-visible optical transmission spectra for an uncoated glass slide and a glass slide coated with an anti-reflective silica film formed by the method of the invention.

By way of comparison, FIG. 5 shows a transmission spectrum of a film similar to that of FIG. 3 with the transmission spectrum of an uncoated glass slide.

Scratch Resistance

The hardness test or scratch resistance test was conducted by taking a set of pencils ranging in hardness from 2 B (soft) to 7H (quite hard) and attempting to scratch the film's surface of Example 1. None of these pencils were able to scratch the material, leading to the conclusion that the material hardness is >7 H on the pencil scale.

These hardness and scratch resistance results indicate that the films of the current invention are similar to glass and significantly better than vacuum coated dielectric low refractive index coatings.

X-Ray Diffraction

Figure 6:
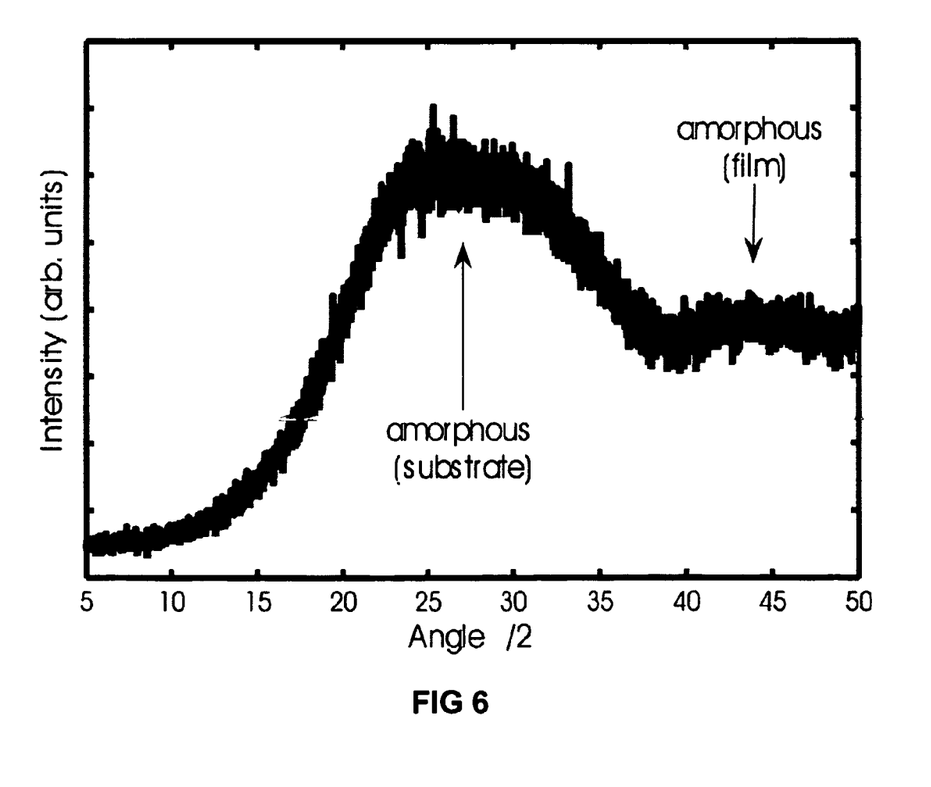
FIG. 6 is an x-ray diffraction image of a film on a glass substrate.
Figure 7:
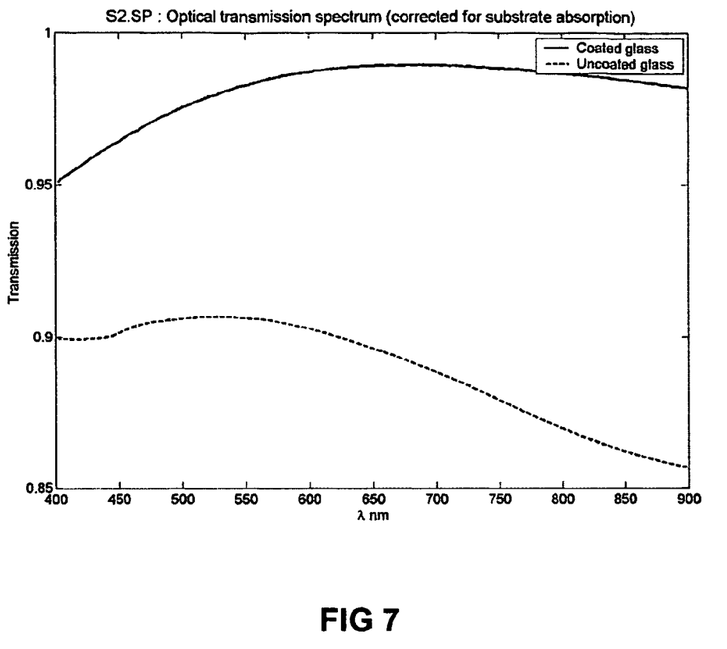
FIG. 7 is an optical transmission spectra of a film designated S2.
Figure 8:
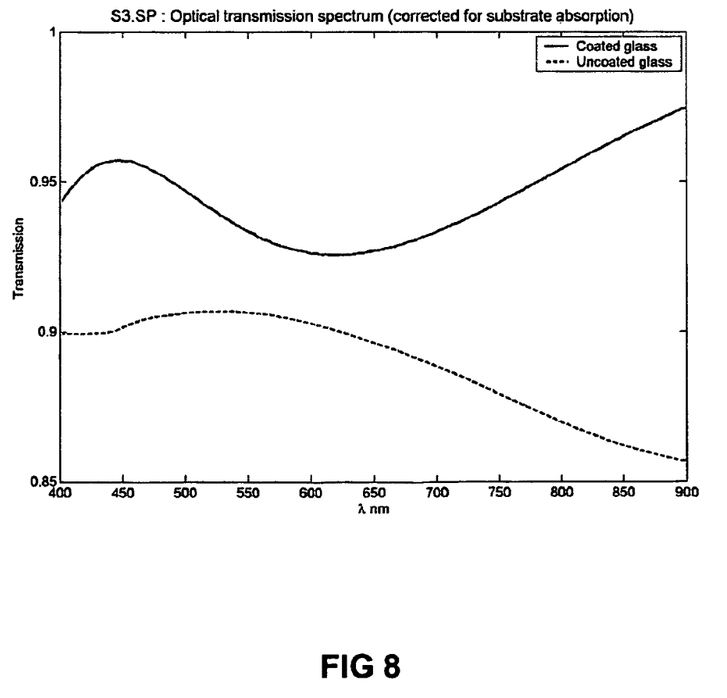
FIG. 8 is an optical transmission spectra of a film designated S3.
Figure 9:
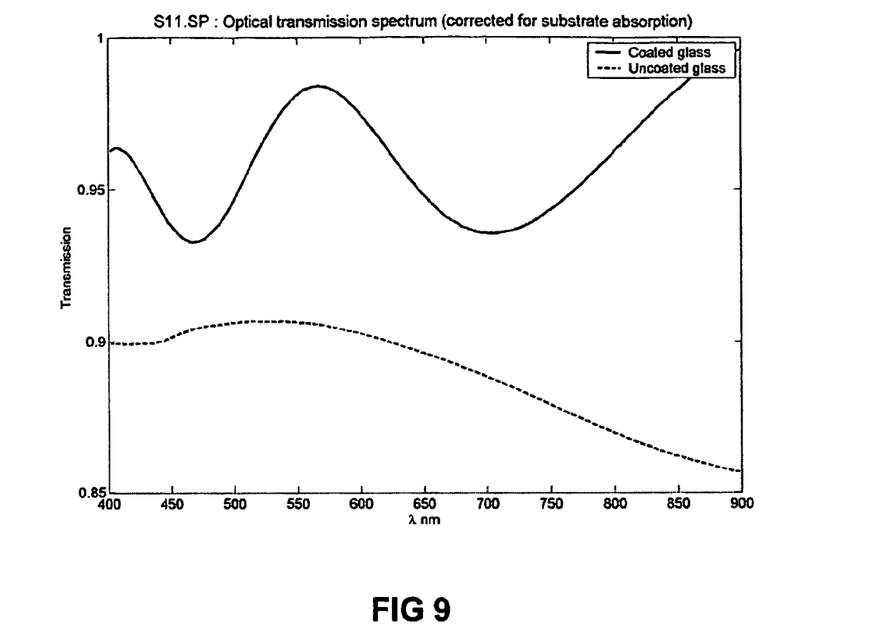
FIG. 9 is an optical transmission spectra of a film designated S11.
Figure 10:
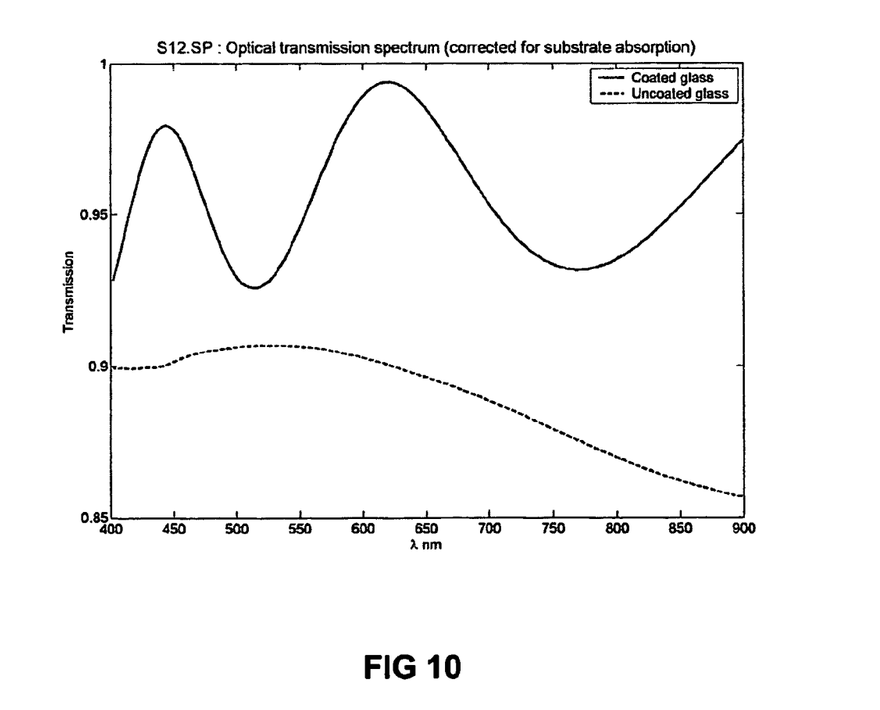
FIG. 10 is an optical transmission spectra of a film designated S12.
Figure 11:
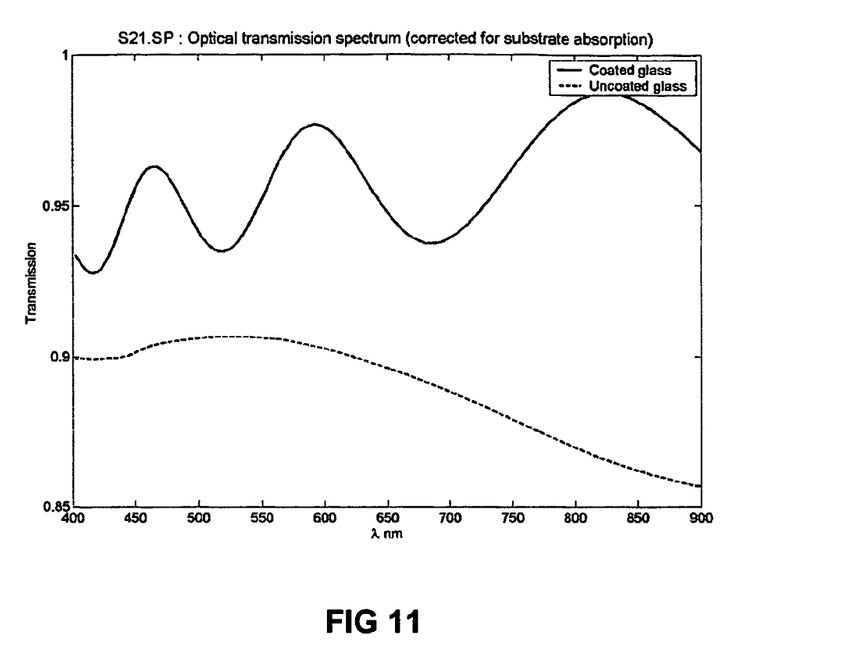
FIG. 11 is an optical transmission spectra of a film designated S21.

An x-ray diffraction scan of a glass slide coated according to the process of example 1 is shown in FIG. 6. The spike close to zero degrees is an artefact and the bulge is normal. This demonstrates that the film is amorphous and there is no appreciable crystallisation occurring.

Solvent Resistance

The films were found to be resistant to washing with water, alcohols, common acids and alkalis Anti-Fogging The silica films formed by the method of Example 1 have been found to provide effective anti-fogging properties. The porosity or surface area of the silica films is approximately 150 m$^2$/g, using standard nitrogen adsorption-absorption techniques. It is believed that coatings having a minimum surface area of 10 m$^2$/g will exhibit anti-fogging properties.

It is believed that the anti-fogging properties of the silica films of the invention are due to the hydrophilicity and high surface area of the films. It is thought that the high surface area and hydrophilicity of the films allows atmospheric water to be absorbed onto the film, thus preventing water droplets from forming.

Example 2

Another silica film was formed in a manner similar to Example 1. To compare the features of the silica film of this example with that of its substrate, a glass slide, UV-visible optical transmission spectra was recorded for both a coated substrate and uncoated substrate, shown in FIG. 5.

Ordinarily, ~4% of incident light is reflected from each glass-air interface, leading to a normal transmission of ~92% for an uncoated glass substrate. FIG. 3 shows the increase (~94.6%) in transmission that can be achieved by coating one side of a glass substrate with a low refractive index film produced by the new process. Theoretically, a thin film of refractive index ~1.22, and of an appropriate thickness, would be the perfect anti-reflective coating for glass, as it would have a 96% transmission for a single sided coating. This transmission value is very close to the experimental value. Showing that the films of the current invention are effective anti-reflective coatings for glass.

Example 3

A substrate, for example a mirror, is sprayed with the silica precursor formulation. An aqueous ammonia solution is sprayed over the silica precursor formulation. The silica precursor is allowed to cure at room temperature forming a silica film.

Example 4

A number of films were produced to demonstrate anti-reflection properties. Films less than 1 μm are generally required for anti-reflection applications and can be formed by, for example, dipping or spinning. Each film was produced according to the following procedure. Table 1 sets out the variation that was made to the procedure for each film.

The general procedure was to add 20 ml of methyl-silicate-51 (comprising silicic acid tetramethyl ester homopolymer >94%, tetramethoxysilane <3%, methanol <3%) {supplied by COLCOAT CO. LTD. 3-28-6 Omorinishi, Ota-ku, Tokoyo 143-0015, Japan} to a solution of 120 ml ethanol or methanol to form a silica precursor formulation. It should be noted that no additional water above that provided by the environment is added to the formulation.

The silica precursor solution is applied to both sides of a cleaned glass substrate by dip coating. Typical coating conditions include: immersion rate=300 mm/min, dwell time=90 s, withdrawal rate=100 mm/min. It will be appreciated that these parameters will determine the ultimate thickness of the coating post curing.

The coated substrate is placed in a closed container containing alcohol vapour and the coating allowed to settle for 5 mins. The coated substrate is placed in a closed container containing a curing agent (10 ml of alcohol and 10 ml of 25% aqueous ammonia solution). This creates an appropriate ammoniacal atmosphere for the film to cure. The container is arranged in such a manner that the film is never in contact with the curing liquid as in Example 1. This curing step continues until the film solidifies and becomes mechanically robust.

Four films were produced according to the method of Example 4 but with the ratio of alcohol to MS-51 varied. A fifth film was produced with a slower withdrawal rate of 70 mm/min. The following table summarises the samples including a designated code, the MS-51 to alcohol ratio, the dipping withdrawal speed, the refractive index at 550 nm and the thickness in nanometres.

TABLE 1

| Code | MS-51:EtOH | Dip | n | d |
|---|---|---|---|---|
| S2 | 1:10 | 100 | 1.20 | 118 |
| S3 | 2:10 | 100 | 1.23 | 280 |
| S11 | 5:10 | 100 | 1.24 | 453 |
| S12 | 6:10 | 100 | 1.22 | 639 |
| S21 | 9:10 | 70 | 1.28 | 686 |

Figure 12:
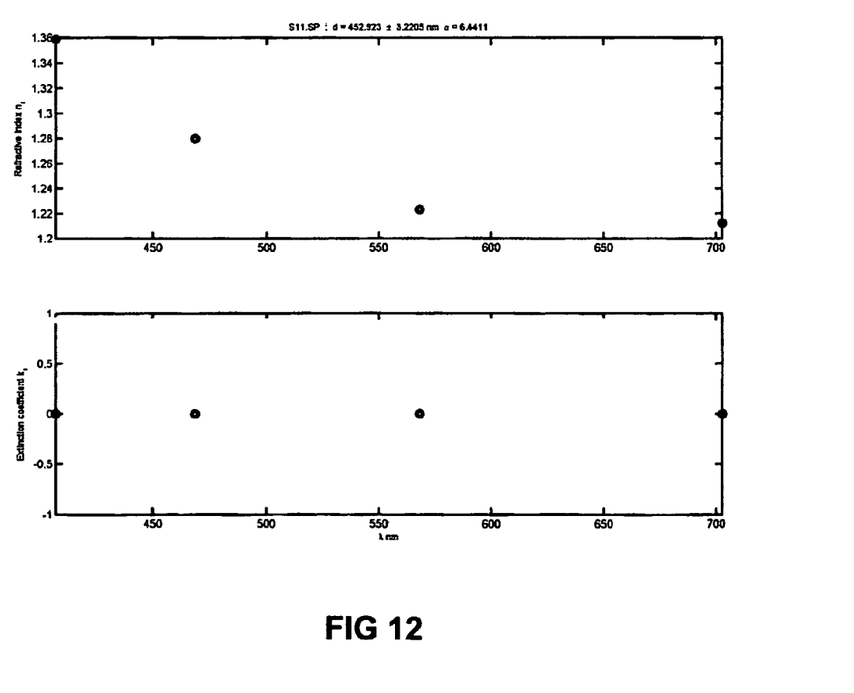
FIG. 12 shows refractive index and extinction coefficient data for the film of FIG. 9.
Figure 13:
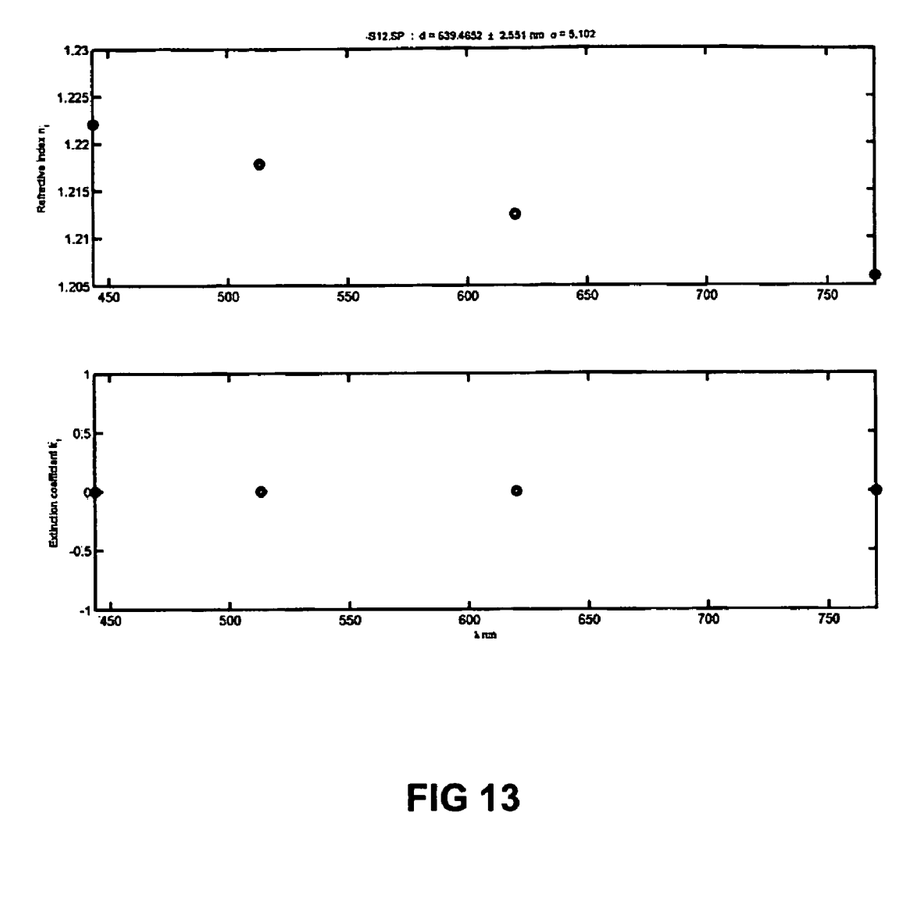
FIG. 13 shows refractive index and extinction coefficient data for the film of FIG. 10.

FIGS. 7-11 shows the optical transmission spectra for the films designated S2, S3, S11, S12 and S21 in Table 1. FIGS. 12-13 show the refractive index and extinction coefficient for the films designated S11 and S12. These spectra demonstrate the usefulness of the produced films for anti-reflection applications.

The silica thin films produced by this method have been found to have a number of favourable characteristics, including:
  a low refractive index in the visible spectrum, typically 1.1 to 1.56;
  high optical transparency;
  high optical and thickness uniformity;
  mechanical robustness similar to glass;
  chemical and photochemical properties similar to glass;
  high porosity, leading to efficient anti-fogging behaviour;
  excellent adhesion to conventional substrates, such as glasses, plastics, metals, ceramics, semiconductors, and the like; and
  durability/long term stability.

A number of features of the silica films of the current invention may be tailored or tunable to suit the final application of the film, for example;

Tunable refractive index—The refractive index may be tuned according to need by adjusting the composition, in particular the alcohol and water content. Table 1 shows the effect of precursor composition on refractive index.

Tunable film thickness—The film thickness can be tuned by adjusting the initial alcohol and water contents in the precursor formulation and, can also be adjusted by varying the parameters relating to the deposition method, such as spin speed, viscosity, dip coating withdrawal rate, and the like using standard methods for the chosen coating technique.

The viscosity of the silica precursor formulation may be altered to facilitate its use in a range of applications, for example, a highly viscous formulation may be formed so that when sprayed onto a substrate to create a thin coverage of the precursor it does not flow significantly whilst curing.

The method of the current invention provides a low cost simple method for producing robust films with effective control over the thickness and refractive index of the coating, along with being able to coat a range of substrate materials and shapes.

The above properties make the films ideal candidates for cheap, robust, efficient optical coatings for applications including antireflection coatings, chemical and mechanical barrier coatings, anti-fogging coatings, anti-glare coatings (light diffusing effect), high reflectivity coatings, low refractive index supports and cladding and dielectric barrier layers.

The silica thin films of the invention may be employed as low refractive index optical coatings for anti-reflection coatings or as low and high refractive index materials in high-low refractive index multilayer coatings. As a low refractive index optical coating the silica thin films may be applied to all forms of glass including spectacles, windows, windscreens, decorative, etc.; coatings for CRT and other display devices such as computer monitors, televisions, etc.; coatings for solar cells; optical instrument coatings such as lenses, mirrors, and the like; active and passive optical waveguides in telecommunications, and advanced photonics; and optoelectronic devices.

The silica thin films may also be used as physical and chemical barrier coatings including, invisible metal and plastics protection, invisible protection for delicate optical surfaces.

The silica thin films may also be used as anti-fogging coatings for applications including automotive and marine glass, architectural glass, spectacles, windows of all sorts, bathroom mirrors and shower screens.

The films may also be produced with an additional component imbedded in the porous network to make the film an active coating. The nanoporous structure of the film also makes it potentially useful as a nanoseive.

It will be appreciated by the person skilled in the art that the above films may be formed on or applied to glass surfaces that are already in place, such as existing windows and mirrors. In aftermarket applications the silica precursor formulation may be mixed with the curing agent immediately prior to application, mixed during application such as through a common spray nozzle or after the silica precursor has been applied to a substrate. The silica precursor may be applied by coating, wiping or spraying the respective component onto the substrate being treated. The curing agent may be any gaseous or aqueous strong alkali, including ammonia, alkali metal hydroxides, quaternary alkyl ammonium hydroxides and the like.

Throughout the specification the aim has been to describe the preferred embodiments of the invention without limiting the invention to any one embodiment or specific collection of features.

Throughout this specification, unless the context requires otherwise, the word "comprises", and variations such as "comprise" or "comprising", will be understood to imply the inclusion of a stated integer or group of integers or steps but not to the exclusion of any other integer or group of integers.

The invention claimed is:

1. A method of forming a silica film coated on a substrate including the steps of:
producing a silica precursor solution having a water content of no more than 5% by volume by dissolving silicic acid tetramethyl ester homopolymer in a solvent;
coating a substrate with the silica precursor solution; and
curing the silica precursor solution onto the substrate in a vaporous ammoniacal environment.

2. The method of claim 1 wherein the solvent is alcohol or an alcohol-aqueous solution.

3. The method of claim 2 wherein the silica precursor solution is formed by adding methyl-silicate-51 (MS-51), comprising greater than 94% silicic acid tetramethyl ester homopolymer by volume, greater than 0% and less than 3% tetramethoxysilane by volume and greater than 0% and less than 3% methanol by volume, to the solvent.

4. The method of claim 1 wherein the silica precursor solution contains an amount of tetramethoxysilane.

5. The method of claim 1 wherein the silica precursor solution is formed by adding methyl-silicate-51 (MS-51), comprising greater than 94% silicic acid tetramethyl ester homopolymer by volume, greater than 0% and less than 3% tetramethoxysilane by volume and greater than 0% and less than 3% methanol by volume, to the solvent.

6. The method of claim 5 wherein the silica precursor solution comprises about 0.2-100 parts alcohol by volume and 0.01-1 parts water by volume for each part of MS-51.

7. The method of claim 6 wherein the silica precursor solution comprises about 0.2-5 parts alcohol by volume and 0.01-0.1 parts water by volume for each part of MS-51.

8. The method of claim 7 wherein the ratio of reagents in the silica precursor solution is 1.0 part MS-51:0.1 parts water: 10.0 parts alcohol by volume.

9. The method of claim 1 wherein the coating is performed by spin coating or dipping.

10. The method of claim 1 wherein the coating further includes allowing the coating to settle before curing.

11. The method of claim 1 wherein the curing is carried out by placing the coated substrate in a closed ammoniacal environment.

12. The method of claim 11 wherein the ammoniacal environment contains water, ammonia and alcohol.

13. The method of claim 12 wherein the solvent used in the formation of the silica precursor solution is an alcohol, and the alcohol contained in the ammoniacal environment is the same alcohol as used in the formation of the silica precursor solution.

14. The method of claim 13 further including controlling a porosity of the silica film by controlling the solvent content and type in the precursor solution and alcohol content and type in the ammoniacal environment.

15. The method of claim 12 further including controlling the alcohol content in the ammoniacal environment to control characteristics of the silica film.

16. The method of claim 1 further including controlling the solvent content to control characteristics of the silica film.

17. The method of claim 1 further including controlling a pore size of the silica film by controlling the solvent content and type in the silica precursor solution.

18. The method of claim 1 further including controlling a pore density of the silica film by controlling the solvent content and type in the ammoniacal environment.

19. A method of forming a silica film coated on a substrate including the steps of:
producing a silica precursor solution having a water content of no more than 5% by volume by dissolving silicic acid tetramethyl ester homopolymer in a solvent;
coating a substrate with the silica precursor solution to form a coated substrate;
placing the coated substrate in a curing chamber;
establishing equilibrium between the solvent in the silica precursor solution and an internal atmosphere of the curing chamber; and
curing the silica precursor solution onto the substrate in an ammoniacal environment containing solvent by introducing ammonia vapour and water vapour into the curing chamber.

* * * * *